US008420032B1

(12) United States Patent
Ermanoski (10) Patent No.: US 8,420,032 B1
(45) Date of Patent: Apr. 16, 2013

(54) MOVING BED REACTOR FOR SOLAR THERMOCHEMICAL FUEL PRODUCTION

(75) Inventor: Ivan Ermanoski, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 13/220,321

(22) Filed: Aug. 29, 2011

(51) Int. Cl.
*B01J 8/08* (2006.01)
*B01J 19/12* (2006.01)
*C01B 3/10* (2006.01)

(52) U.S. Cl.
USPC ........... 422/630; 422/631; 422/634; 422/198; 422/199; 423/657

(58) Field of Classification Search .................. 422/630, 422/631, 634, 198, 199; 423/657
See application file for complete search history.

(56) References Cited

U.S. PATENT DOCUMENTS

| | | | | |
|---|---|---|---|---|
| 4,105,517 A | * | 8/1978 | Ryason et al. | 204/157.5 |
| 4,278,650 A | * | 7/1981 | Dorrance | 423/579 |
| 2010/0136442 A1 | * | 6/2010 | Abanades et al. | 429/421 |

OTHER PUBLICATIONS

Abanades et al. Thermochemical hydrogen production from a two-step solar driven water-splitting cycle based on cerium oxides. Solar Energy 80 (2006) 1611-1623.*
Gokon: "Thermochemical two-step water-splitting reactor with internally circulating fluidized bed for thermal reduction of ferrite particles," International Journal of Hydrogen Energy #33, 2008, 2189-2199, 11 pages.
Kodama, "Application of an Internally Circulating Fluidized Bed for Windowed Solar Chemical Reactor vvith Direct Irradiation of Reacting Particles," by et al. from the Journal of Solar Energy Engineering, dated Feb. 2008, vol. 130, 4 pages.
Kodama, "Coal Coke Gasification in a Windowed Solar Chemical Reactor for Beam-Down Optics," Journal of Solar Energy Engineering, Nov. 2010, vol. 132, 014504-1 to 014504-6, 6 pages.
AGRAFIOTIS, "The Hydrosol Process: Solar-Aided Thermo-Chemical Production of Hydrogen from Water with Innovative Honeycomb Features," Aerosol and Particle Technology Laboratory (APTL), Chemical Process Engineering Research Institute, Center for Research and Technology-Hellas (CERTH/CPERI), dated Oct. 27-29, 2007, 8 pages.
Siegel, "Solar Hydrogen Production with a Metal Oxide Based Thermochemical Cycle,", Solar Technologies Department, published online at www.hydrogen.energy.gov/pdfs/review11/pd081_siegel_2011_o.pdf on May 17, 2011. 19 pages.

* cited by examiner

*Primary Examiner* — Jennifer A Leung
(74) *Attorney, Agent, or Firm* — Olivia J. Tsai (57) ABSTRACT

Reactors and methods for solar thermochemical reactions are disclosed. Embodiments of reactors include at least two distinct reactor chambers between which there is at least a pressure differential. In embodiments, reactive particles are exchanged between chambers during a reaction cycle to thermally reduce the particles at first conditions and oxidize the particles at second conditions to produce chemical work from heat. In embodiments, chambers of a reactor are coupled to a heat exchanger to pre-heat the reactive particles prior to direct exposure to thermal energy with heat transferred from reduced reactive particles as the particles are oppositely conveyed between the thermal reduction chamber and the fuel production chamber. In an embodiment, particle conveyance is in part provided by an elevator which may further function as a heat exchanger.

11 Claims, 7 Drawing Sheets

MOVING BED REACTOR FOR SOLAR THERMOCHEMICAL FUEL PRODUCTION

GOVERNMENT INTERESTS

Embodiments of the invention were developed under Contract No. DE-AC04-94AL85000 between Sandia Corporation and the U.S. Department of Energy. The United States Government has certain rights in this invention.

TECHNICAL FIELD

Embodiments of the present invention relate to solar thermochemical fuel production and more particularly relate to a moving bed reactor for solar thermochemical fuel production.

BACKGROUND

Solar concentration systems typically entail optics (mirrors or lenses) to focus a large area of sunlight, or solar thermal energy, onto a small area. The solar thermal energy may drive a heat engine, such as a steam turbine, which may be further coupled to an electrical power generator to convert a portion of the solar thermal energy into electricity. Solar concentration systems may also drive a thermochemical reaction to generate a fuel that chemically stores a portion of the solar thermal energy. Water splitting, gasification of coal, and reforming of methane are all under investigation as potential solar thermochemical fuel production techniques. Solar concentration systems may drive other important reactions on an industrial scale as well, such as $CO_2$ reduction into CO, for example.

Many solar thermochemical reactions entail a redox cycle. In a water splitting reaction to produce hydrogen from water, a metal-oxide redox pair is thermally reduced and the reduced reactive media then drives decomposition of water. The metal oxide is then reduced again to repeat the cycle. While identifying advantageous metal-oxides is currently a subject of research, thermodynamic considerations dictate the thermal reduction portion of the cycle generally requires a high temperature, typically between 1000-2000° C., depending on the reactive oxide chosen and other conditions in the system.

Solar thermochemical reactors can take many forms, affording more or less efficient fuel production, scalability, etc. One conventional system utilizes a honeycomb substrate that is coated with the reactive oxide. The honeycomb substrate is alternately exposed to collected solar energy to heat the system and reduce the reactive oxide, and to a reactant gas, such as $H_2O$ in the case of water splitting, to generate fuel. Such a reactor is essentially a fixed bed, and as such, suffers temperature non-uniformities and low thermal efficiency because much of the solar energy 105 is expended on heating non-reactive portions of the bed (e.g., honeycomb substrate) and is ultimately rejected from the system as waste heat, rather than utilized for fuel production. Also, with each redox cycle, the entire system undergoes extreme thermal cycling, leading to component fatigue.

Figure 1:
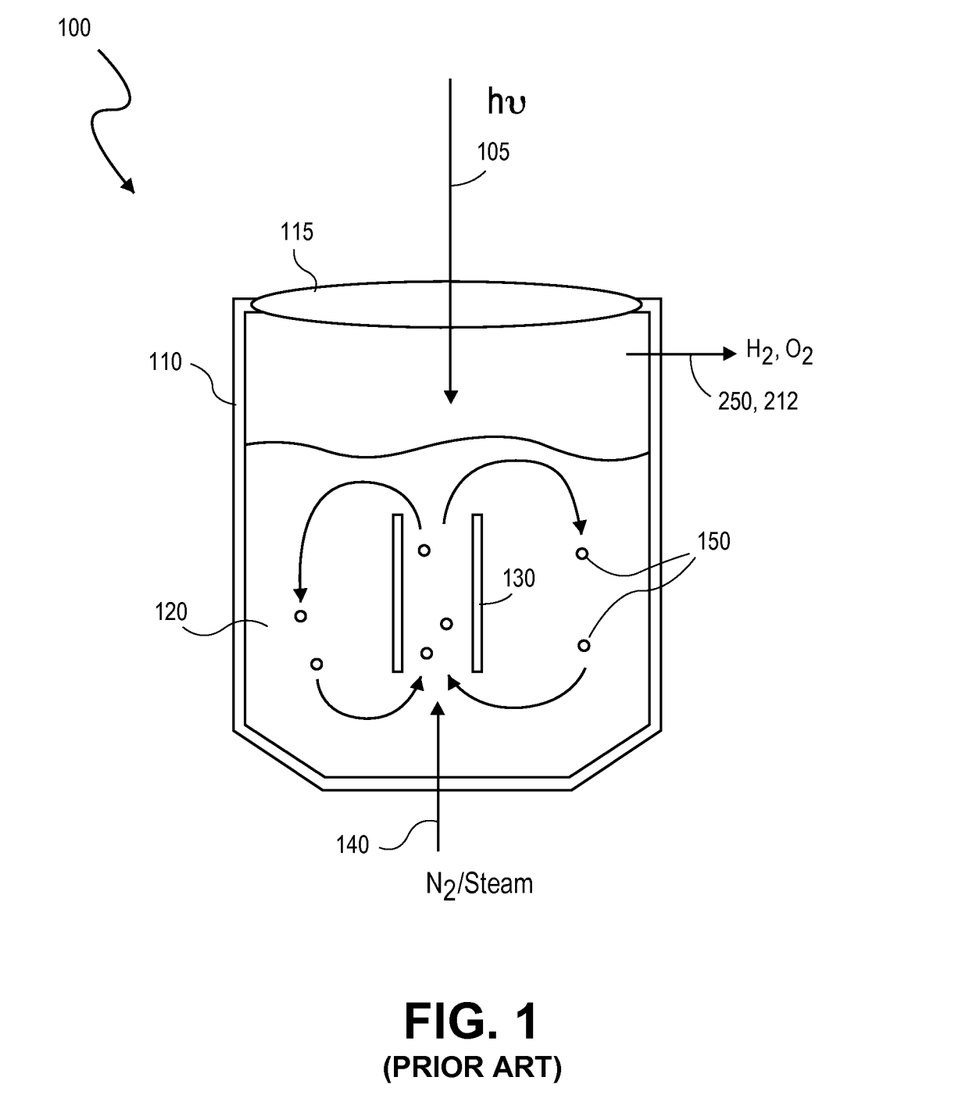
FIG. 1 illustrates a conventional solar thermochemical reactor design.

FIG. 1 illustrates a conventional solar thermochemical reactor design including a fluidized bed of reactant particles. As shown, the solar thermochemical reactor 100 includes a reactor vessel 110 having a window 115 through which a solar flux 105 is received into the reactor vessel 110. Reactive oxide particles 150 and a gas 140 form a fluid-solid mixture 120 contained within the reactor vessel 110. The reactive oxide particles 150 are internally circulated within the vessel 110 (up through draft 130 and down the external annular region), to improve temperature uniformity relative to a fixed bed. However, similar to the honeycomb reactor, the thermochemical reactor 100 operates in two discrete modes, depending on the composition of the gas 140. During a thermal-reduction mode, the gas 140 is an inert (e.g., $N_2$) and the reactor vessel 110 is heated by the solar flux 105. During a water-decomposition mode, the gas 140 is steam and the solar flux 105 is discontinued to cool the reactor vessel 110. As such, much of the solar energy 105 is again rejected from the reactor 100 as waste heat, rather than utilized for fuel production and components of the reactor 110 are repeatedly temperature cycled.

A system which avoids many of the difficulties and efficiency limitations associated with existing reactors would advantageously advance the art of solar thermochemical fuel production.

SUMMARY OF THE DESCRIPTION

Reactors and methods for solar thermochemical reactions are described herein. Embodiments of reactors provide at least two distinct reactor chambers between which there is at least a pressure differential. In embodiments, reactive particles are exchanged between chambers during a reaction cycle to thermally reduce the particles at first conditions and oxidize the particles at second conditions to produce chemical work from heat.

In one embodiment, reactive particles are thermally reduced in a thermal reduction chamber through direct illumination of concentrated solar energy. Coupled to the thermal reduction chamber is a fuel production chamber in which reduced particles are oxidized to reduce a reactant gas introduced into the fuel production chamber. A conveyance continuously moves the reactive particles between the thermal reduction chamber and the fuel production chamber with the chambers continually operating at their respective steady state conditions.

In embodiments, chambers of a solar thermochemical reactor are coupled to a heat exchanger to pre-heat the reactive particles prior to direct exposure to thermal energy. The heat exchanger transfers heat from reduced reactive particles to oxidized reactive particles as the reduced and oxidized particles are oppositely conveyed between the thermal reduction chamber and the fuel production chamber In an embodiment, particle conveyance is in part provided by an elevator having an interior through which reactive particles are conveyed in a first direction while other reactive particles are conveyed in a second direction on an exterior shaft surface. In one such embodiment, the elevator further has the attributes of a heat exchanger to pre-heat the reactive particles.

BRIEF DESCRIPTION OF THE DRAWINGS

Embodiments of the present invention are illustrated by way of example, and not limitation, in the figures of the accompanying drawings in which.

DETAILED DESCRIPTION

Described herein are moving bed solar thermochemical reactors and methods of operation. In the following description, numerous details are set forth. It will be apparent, however, to one skilled in the art, that the present invention may be practiced without these specific details. In some instances, well-known methods and devices are shown in block diagram form, rather than in detail, to avoid obscuring the present invention. Reference throughout this specification to "an embodiment" means that a particular feature, structure, function, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the two embodiments are not mutually exclusive.

The terms "coupled" and "connected," along with their derivatives, may be used herein to describe structural relationships between components. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g., as in a cause and effect relationship).

The reactive particles applicable to the systems and techniques described herein may generally be of any type known for thermochemical reactions that are further suitable for conveyance by the systems and techniques described herein. Although the reactive particles are not consumed significantly with each reaction cycle in the exemplary embodiments described herein, one of skill in the art will note the systems and techniques described herein enable particle continuous addition and are therefore readily adaptable to embodiments where the reactive particles may be consumed (e.g., volatilized) and replenished. Reactive particles applicable to the systems and techniques described herein may be a solid media of homogenous or heterogeneous composition (e.g., carrier media coated with reactive media) and of various porosity. While the exemplary embodiments utilize a metal oxide ($MO_x$), such as ceria ($CeO_2$), ferrite, manganite, cobalt oxide, and the like, alternative embodiments may employ any other known particle composition capable of similar cyclic redox reactions. Reactive particles applicable to the systems and techniques described herein may also vary in size significantly with smaller sizes having higher surface/volume ratios improving reaction rates, but potentially being more susceptible to sintering and/or melting. For one exemplary ceria particle embodiment, particle size is between about 5 μm (microns) and 50 μm (microns).

Figure 2:
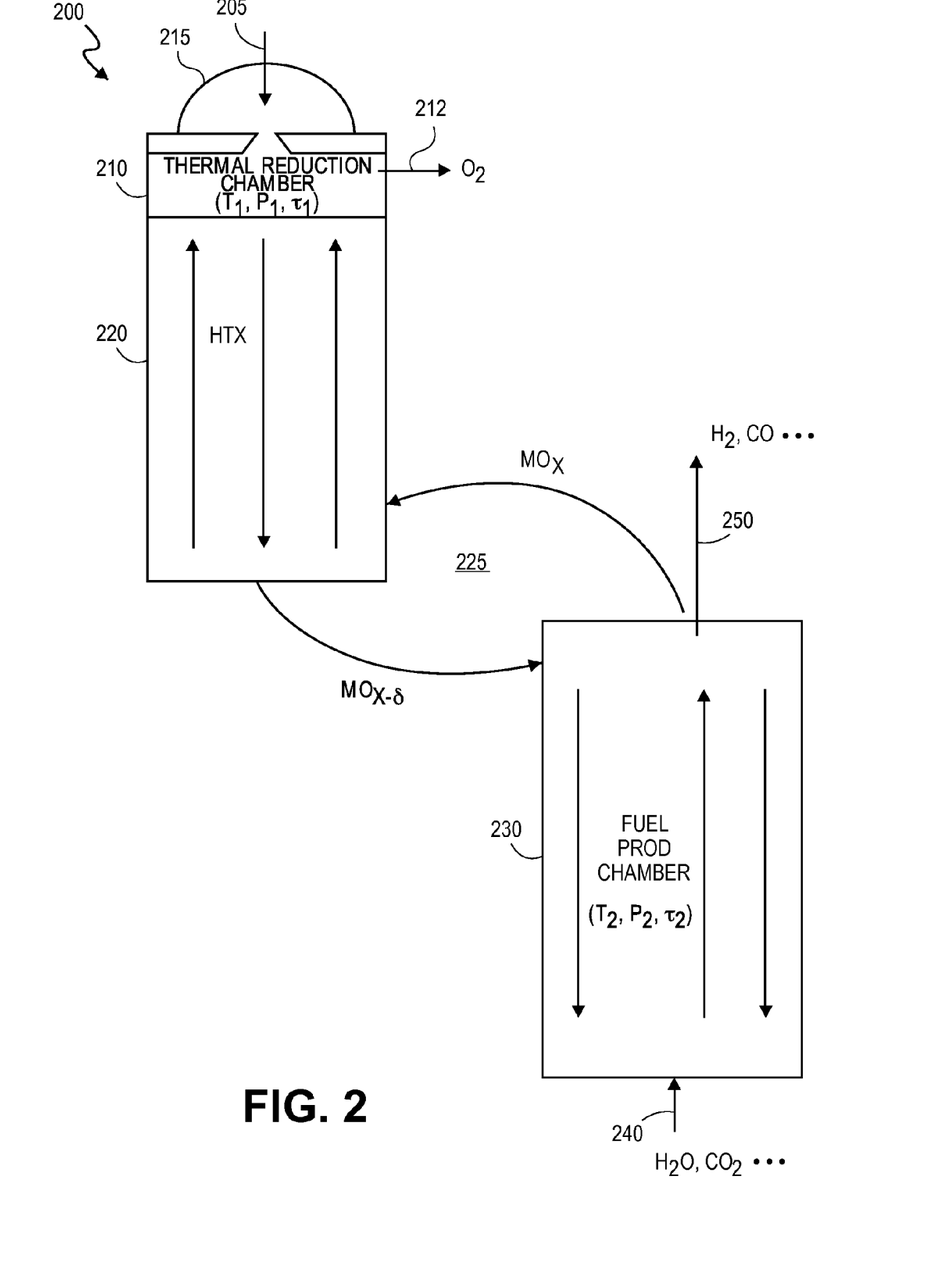
FIG. 2 illustrates a schematic of a moving bed solar thermochemical reactor, in accordance with an embodiment of the present invention.
Figure 3:
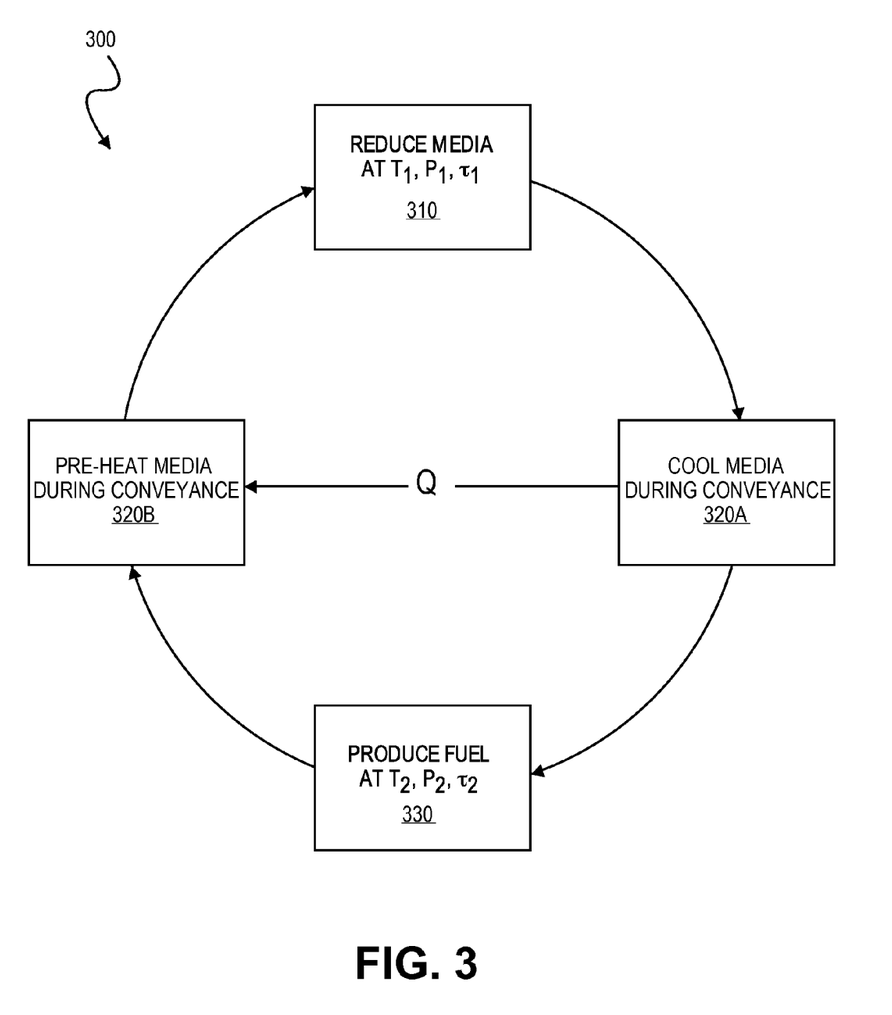
FIG. 3 illustrates a solar thermochemical cycle executed by a moving bed solar thermochemical reactor, in accordance with an embodiment of the present invention.

FIG. 2 illustrates a schematic of a moving bed solar thermochemical reactor 200, in accordance with an embodiment of the present invention. FIG. 3 illustrates a two-step metal-oxide redox cycle which may be executed by the moving bed solar thermochemical reactor 200 to produce fuel, in accordance with an embodiment of the present invention. Generally, the moving bed solar thermochemical reactor 200 may be conceptualized as a particle-exchange engine that implements the redox cycle 300 (FIG. 3). Reactive particles are exchanged between a thermal reduction chamber 210 (FIG. 2) where the particles are reduced (e.g., $MO_{x-\delta}$) at first process conditions provided during the operation 310, and a fuel production chamber 230 where the particles are oxidized (e.g., $MO_x$) at second conditions during operation 330 to produce chemical work from solar heating.

In an embodiment, the thermal reduction chamber 210 is to thermally reduce reactive particles through direct heating by solar energy to a reduction temperature $T_1$ and a reduction pressure $P_1$. At the operation 310, reactive particles disposed in the thermal reduction chamber 210 (FIG. 2) are exposed to a solar energy flux 205. In the exemplary embodiment, the solar energy flux 205 is beam-down and directly irradiates the reactive particles disposed in the thermal reduction chamber 210 through an aperture 215 (e.g., quartz window) in the ceiling of the reactor disposed a distance away from the reactive particles to avoid contact. However, any means known in art may be employed to concentrate the solar energy flux 205 to achieve a desired solar power, such as parabolic troughs, dish, power towers, etc., and embodiments of the present invention are not limited in this respect. For the exemplary ceria particle, the reduction reaction of operation 310 proceeds as:

Where ΔH is the reduction enthalpy of ceria and x is the extent of reduction. Other metal-oxide particles also undergo similar a reaction.

The optimal reduction temperature $T_1$ may vary considerably as a function of the thermal reduction properties of the reactive particle. The extent of reduction x achieved during the operation 310 for a particular reactive particle composition is also a function of the reduction pressure $P_1$ maintained in the thermal reduction chamber 210. Generally the reduction temperature $T_1$ may be expected to be in the range of 1000° C. to 1700° C., and more particularly in the range of 1300° C. to 1600° C. for the exemplary ceria particle with the extent of reduction x increasing for a given reduction temperature $T_1$ as partial pressure of oxygen in the thermal reduction chamber 210 decreases. During operation 310, a vacuum is pulled on the thermal reduction chamber 210 to maintain a sub-atmospheric reduction pressure $P_1$ and to extract oxygen ($O_2$) 212 generated by thermal reduction of the reactive particles. For particular ceria particle embodiments, the reduction pressure $P_1$ has a partial pressure of $O_2$ below 100 Pa, and preferably below 10 Pa, where $T_1$ is in the range of 1300° C. to 1600° C. and preferably approximately 1500° C.

In an embodiment, the fuel production chamber 230 is to reoxidize the reduced particles at a fuel production temperature $T_2$ and a fuel production pressure $P_2$. During operation 330 (FIG. 3), reactive particles disposed in the fuel production chamber 230 (FIG. 2), are exposed to a reactant fluid 240

(a gas or liquid). In the illustrative embodiments, the reactant fluid 240 is steam ($H_2O$) for a water-splitting embodiment, or carbon dioxide ($CO_2$) in an alternative embodiment. The reactive particles undergo a reaction in the presence of the reactant fluid and are reoxidized while the reactant fluid is reduced into fluid reaction products 250. Depending on the composition of the particle the reaction may be limited to the surface or, as in the case of the exemplary ceria particle which is an oxygen ion conductor, the entire volume of the particle may participate in the reaction. In the illustrative embodiments, the fluid reaction products 250 are hydrogen ($H_2$) for the water-splitting embodiment, or CO in the alternative embodiment. The fluid reaction products 250 are removed from the reactor 200 as mixed with the reactant fluid 240. For the exemplary ceria particle, the hydrolysis reaction of operation 330 proceeds as:

$$\frac{1}{x}CeO_{2-x} + H_2O \rightarrow \frac{1}{x}CeO_2 + H_2 + \Delta Q, \quad (2)$$

where $\Delta Q$ is the heat released by hydrolysis and x is again the extent of reduction. Other metal-oxide particles also undergo a similar reaction. Collection of the reaction products 250 (e.g., $H_2$) separately from the $O_2$ 212 generated by thermal reduction is facilitated by physically separating the reactions (1) and (2) between the fuel production chamber 230 and the thermal reduction chamber 210, respectively.

In advantageous embodiments, the fuel production temperature $T_2$ is at least 300° C. below the reduction temperature $T_1$, and preferably between 300° C. and 600° C. below the reduction temperature $T_1$, to render reduction or fuel production thermodynamically favorable. For the exemplary water splitting embodiment, the temperature differential between $T_1$ and $T_2$ advantageously avoids a need to perform any subsequent separation of $H_2$ from $O_2$. In one exemplary ceria embodiment, operation 330 is performed at a fuel production temperature $T_2$ of approximately 1000° C. In further embodiments, the fuel production pressure $P_2$ is maintained at a pressure higher than the reduction pressure $P_1$. A higher fuel production pressure $P_2$ advantageously improves reactor efficiency because the rate of reaction (2) is directly proportional to pressure. In one exemplary ceria embodiment, the fuel production pressure $P_2$ is at least 1 atm, and preferably about 3-6 atm, at a point where the reactant fluid 240 (e.g., steam) is introduced. In certain embodiments, countercurrent flow of the reactive particles and reactant fluid 240 (illustrated in FIG. 2 as opposing flow arrows within the fuel production chamber 230) is provided to maximize the extent of the fuel production reaction.

Figure 4:
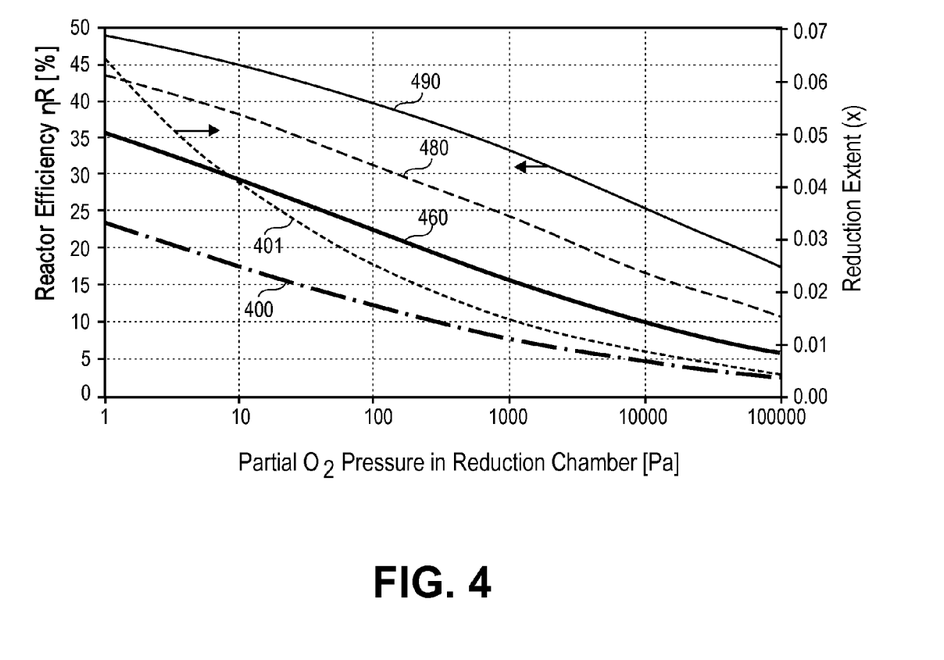
FIG. 4 illustrates a graph of reduction extent and reactor efficiency for a ceria cycle as a function of reduction pressure for several heat recovery efficiencies, in accordance with embodiments of the present invention.

With the reactor 200 maintaining the thermal reduction chamber 210 at a thermal reduction pressure $P_1$ below the fuel production pressure $P_2$ in the fuel production chamber 230 during steady state operation of the reactor 200, the reactor 200 may independently provide optimal processing conditions for the separate operations 310 and 330 of the redox cycle 300. For example, $P_1$ may be designed to achieve a greater extent of reduction x without hampering the fuel production half of the redox cycle 300. FIG. 4 illustrates a curve 401 of the extent of reduction, x, (plotted on the secondary y-axis) for ceria particles, a reduction temperature $T_1$ of 1500° C., and fuel production temperature $T_2$ of 1000° C. as a function of $O_2$ partial pressure in pascals (Pa). As shown, reduction extent declines by a factor of 10 or more as $O_2$ partial pressure increases from 1 Pa to 100000 Pa, or about 1 atmosphere (atm). For one exemplary embodiment, a pressure differential of at least 1 atm is maintained between $P_1$ and $P_2$ during steady state operation where the operations 310 and 330 are continuously performed and the reactive particles continuously transferred between the thermal reduction chamber 210 and the fuel production chamber 230.

As further illustrated in FIG. 2, the moving bed reactor 200 includes a conveyance 225 to move reactive particles between the thermal reduction chamber 210 and the fuel production chamber 230. The conveyance 225 is to provide pressure separation between the thermal reduction chamber 210 and the fuel production chamber 230 so that the differential between the pressure $P_1$ and $P_2$ is maintained while continually moving the first plurality of reactive particles through the chambers of the reactor 200. Being configured for continuous operation, the reactor 200 can be scaled to industrial capacities much more readily than can a system limited to achieving a pressure differential through patch mode operation (e.g., where pressure is varied between batches or modes of operation).

Pressure separation may be maintained by the conveyance 225 via a fluid flow restriction through which the reactive particles pass as they are transferred between the thermal reduction chamber and the fuel production chamber. Depending on the embodiment, the reactive particles may themselves form a fluid flow restriction, sustaining at least a portion of a desired pressure differential between $P_1$ and $P_2$. In further embodiments, pressure isolation is provided with a fluid flow restriction in the form of one or more airlocks disposed in the reactor 200 between the thermal reduction chamber 210 and the fuel production chamber 230. In an embodiment, a first airlock is provided between an outlet of the thermal reduction chamber 210 and an inlet of the fuel production chamber 230 with a reduced reactive particle (e.g., $MO_{x-\delta}$) to pass through the first airlock before entering the fuel production chamber 230. A second air lock may further be coupled between an outlet of the fuel production chamber 230 and an inlet of the thermal reduction chamber 210 with the reoxidized reactive particle (e.g., $MO_x$) to pass through the second airlock before entering the thermal reduction chamber 210.

In the exemplary embodiment illustrated in FIG. 2, the moving bed solar thermochemical reactor 200 further comprises a heat exchanger (HTX) 220 disposed between the thermal reduction chamber 210 and the fuel production chamber 230. The HTX 220 is to recover sensible heat within the reactor 200 by transferring heat energy Q from a reduced reactive particle (e.g., $MO_{x-\delta}$) to pre-heat a reoxidized reactive particle (e.g., $MO_x$) as they are oppositely conveyed between the chambers 210, 230. As further shown in FIG. 3, the hot and cold sides of the HTX 220 implement the additional operations 320A and 320B of the redox cycle 300. This ability to recover sensible heat improves efficiency of the reactor 200 considerably as the amount of solar flux rejected as waste heat is reduced in favor of fuel production.

FIG. 4 further illustrates the advantage of heat exchange for reactor efficiency $\eta_r$ plotted on primary y-axis over the range of $O_2$ partial pressures in the reduction chamber 210 achieving the particular extent of reduction x for the ceria cycle operating between $T_1$ of 1500° C. and $T_2$ of 1000° C. Where $\eta_r$ is a heat-to-fuel efficiency of the reactor 200 defined as $\eta_r = HHV_{H2}/Q$, where $HHV_{H2}$ is the higher heating value of hydrogen, and Q is the total heat that enters the reactor 200 through the aperture 215 to produce 1 mol of hydrogen. As shown in FIG. 4, the curve 400 is the reactor efficiency $\eta_r$ with no heat exchange (i.e., a heat exchanger efficiency of 0%) while the curves 460, 480 and 490 correspond to heat exchanger efficiencies of 60%, 80%, and 90%, respectively. As such, FIG. 4 shows how embodiments of the present invention providing one or both of pressure separation and heat recovery advantageously improve reactor efficiency.

In one embodiment, the HTX 220 is a countercurrent exchanger having a hot side inlet coupled to an outlet of the thermal reduction chamber 210 and a hot side outlet coupled to an inlet of the fuel production chamber 230. A cold side inlet is further coupled to an outlet of the fuel production chamber 230, and a cold side outlet is coupled to an inlet of the thermal reduction chamber 210. With a countercurrent exchanger (represented in FIG. 2 by the opposing flow arrows in HTX 220), heat transfer between the reduced and reoxidized reactive particle(s) is greater than for a concurrent flow exchanger.

Figure 5:
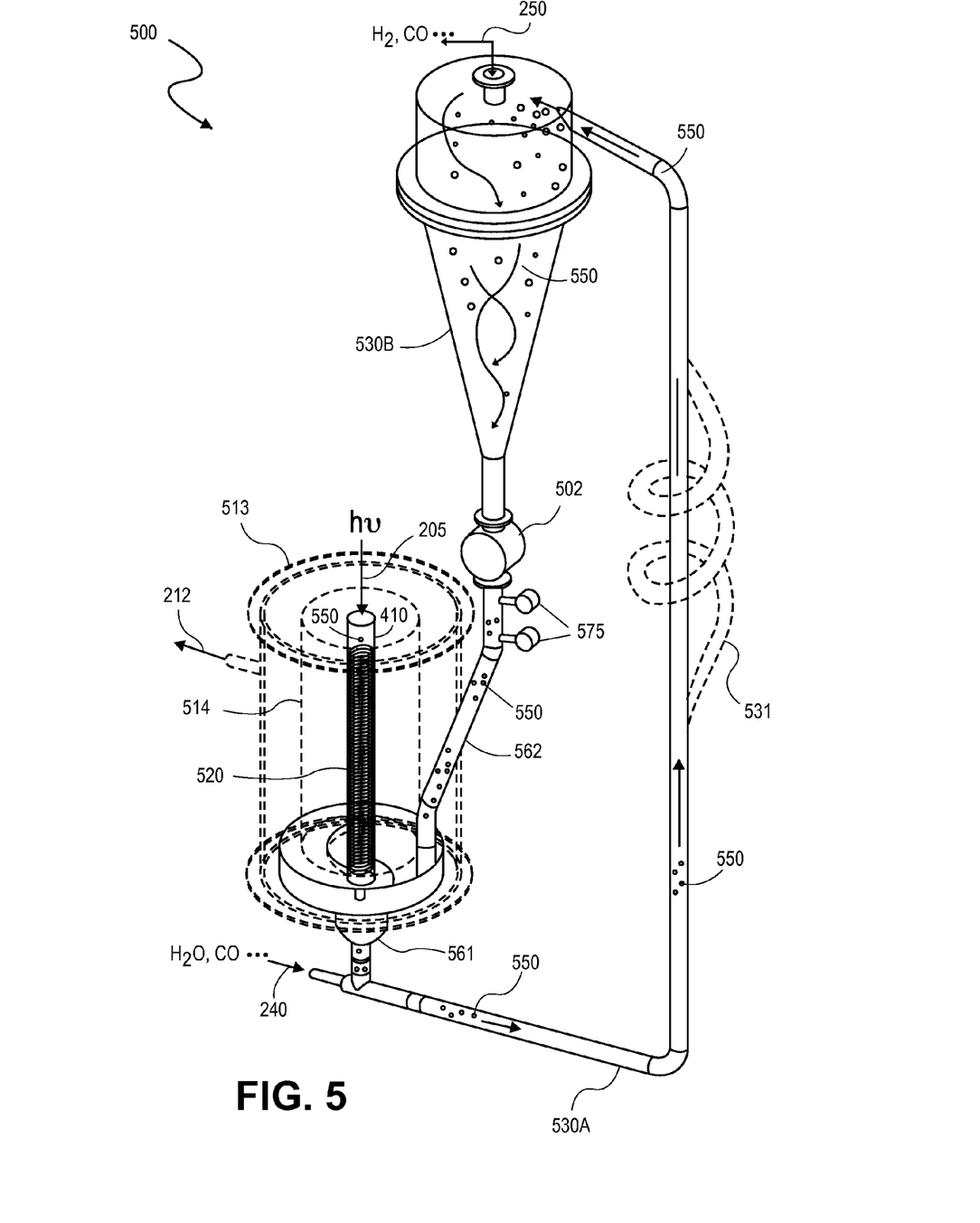
FIG. 5 illustrates an exemplary embodiment of the moving bed solar thermochemical reactor illustrated in FIG. 2.

FIG. 5 illustrates a reactor 500 which is an exemplary embodiment of the moving bed solar thermochemical reactor illustrated in FIG. 2. The reactor 500 further illustrates particular components and techniques for implementing the moving bed reactor 200. It should be appreciated that the exemplary embodiment illustrated in FIG. 5 may be scaled over a wide range of reactor capacities and in so doing any known techniques for scaling the various components to greater capacity may be applied without departing from the scope and spirit of either the moving bed reactor 500 or moving bed reactor 200 (FIG. 2).

As illustrated in FIG. 5, the reactor 500 includes a thermal reduction chamber 510 disposed within a vacuum chamber 515. The vacuum chamber 513 is coupled to a vacuum source to remove the $O_2$ 212 from the reactor 500. The thermal reduction chamber 510 is physically coupled to an elevator 520. An annulus of thermal insulation 514 surrounds the elevator 520 the thermal reduction chamber 510 with a window on a top side of the thermal reduction chamber 510 and a bottom side interfacing with the elevator 520. In the illustrative embodiment, the elevator 520 is vertical, however the elevator slope may be a lesser non-zero value.

Figure 6:
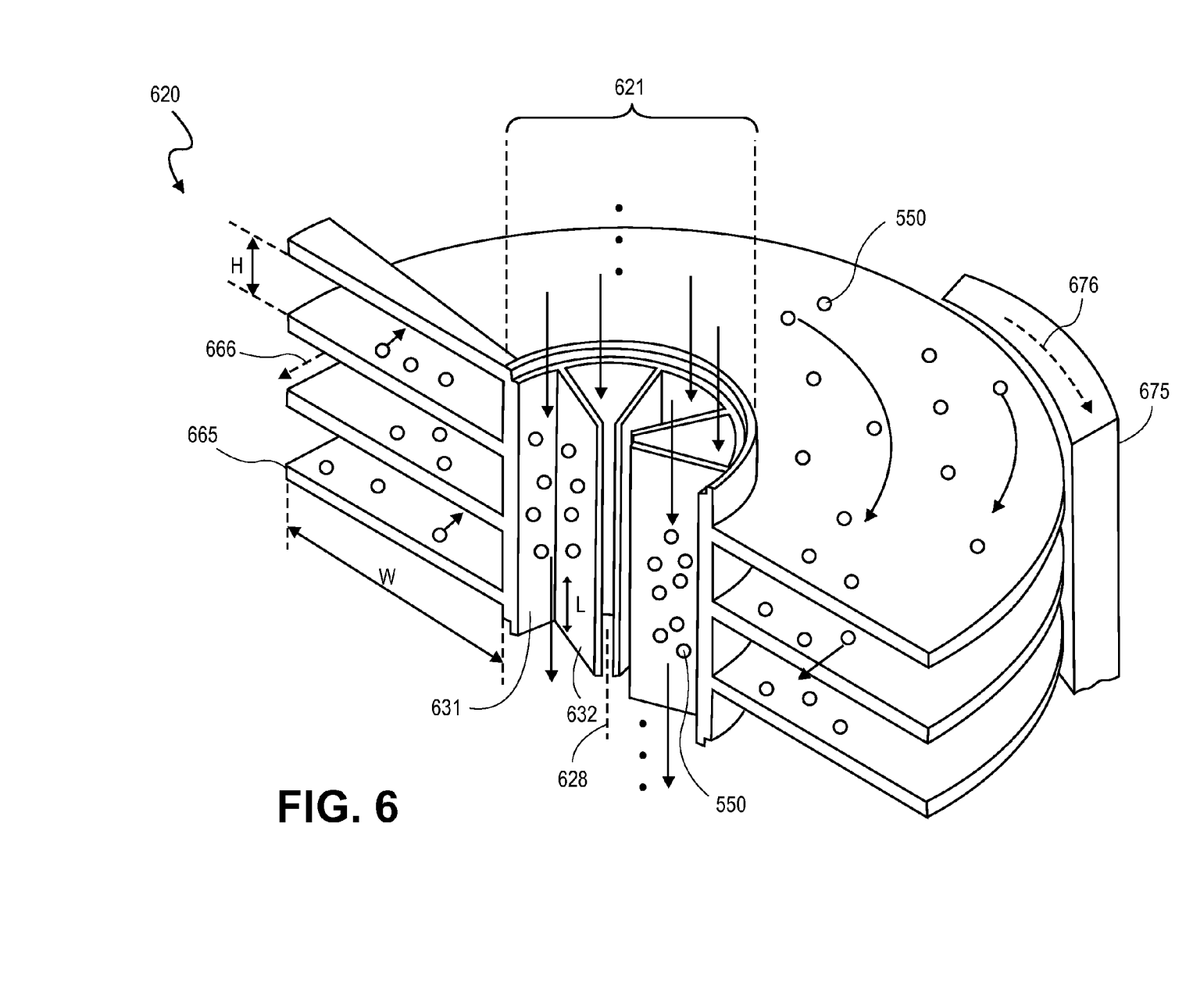
FIG. 6 illustrates an expanded sectional view of an elevator illustrated in FIG. 5, in accordance with an embodiment of the present invention.

In one embodiment the elevator 520 includes an auger. FIG. 6 illustrates an expanded sectional view 620 of the elevator 520, in accordance with an embodiment of the present invention. As shown, the elevator includes a hollow shaft 621 about a longitudinal axis 628. The hollow shaft 621 has an interior surface 631 to continually convey reduced reactive particles 550 (e.g., $MO_{x-\delta}$) in a downward direction along the longitudinal axis 628, away from the solar energy flux 205. The hollow shaft 621 further includes a continuous flighting 665 attached to an outside shaft surface to also continuously convey reactive particles 550 (e.g., $MO_x$) in an upward direction along the longitudinal axis 628, toward the solar energy flux 205. Downward conveyance may be motivated by gravity while an angular velocity of the flighting 665 relative to a surrounding external tube 675 is imparted by the elevator 520 to provide for upward conveyance.

In embodiments, the elevator 520 functions both as a countercurrent conveyance and as a countercurrent heat exchanger for the reactor 500. For such embodiments, the physical components of the elevator 520 (e.g., made of ceramic) transfer heat between the reactive particles being countercurrent conveyed through the elevator 520 to provide a heat exchanger efficiency of at least 50%. Heat recovery via the elevator 520 is improved at increased pressure. Generally, the pressure in a bottom of the heat exchanger is between the reduction pressure $P_1$ and the fuel production pressure $P_2$. Where the pressure at the bottom of heat exchanger is to be set in practice generally depends on the balance between the improved heat exchange, additional pumping work required to evacuate the reduction volume, and desired reduction chamber residence time ti. As such, the elevator pressure profile is further a function of the thermal conductivity of the reactive particles, physical components of the elevator 520, as well as the pumping efficiency.

Referring again to the expanded elevator view illustrated in FIG. 6, the interior surface 631 may further include fins 623 to increase surface area of the elevator 520 and thereby increase heat exchange efficiency. With the fins 632 extending radially from the interior surface 631 toward the longitudinal axis 628 and having a length L extending parallel to the longitudinal axis, the external tube 675 may be coupled to a mechanical drive to rotate the external tube 675 while maintaining the hollow elevator shaft 621 (and therefore the flighting 665) stationary. This type of external drive advantageously minimizes the number of movable parts in the elevator which are exposed to high temperatures and vacuum. In particular embodiments, the elevator 520 has a ratio of flighting spacing H to flighting width W (as illustrated in FIG. 6) that is less than 1:1 to further improve the exchanger efficiency. While exact flighting pitch:diameter (or spacing:width) is a matter of design choice, a smaller flighting spacing generally increases the residence time of a particle traversing the flighting 665 and larger flighting widths increase cold side surface area of the elevator 520 and increase particle throughput. The throughput requirements of the elevator 520 may be determined based on a desired reduction chamber residence time $\tau_1$.

Returning to FIG. 5, the hollow elevator shaft 621 is coupled to a rotary airlock 561. The rotary airlock 561 may be any known in the art which will ensure adequate pressure separation between the elevator 520 and the conduit 530A where the reactant fluid 240 is introduced. As such, pressure separation is provided in part by a pressure drop across the column of particles within the hollow elevator shaft 621 and in further part by the rotary airlock 561. As an example, steam may be introduced at approximately 400-600 kPa and depending on the pressure drop within the vacuum chamber 513 along the length of the elevator 520, the airlock 561 is to provide a fluid flow restriction sufficient to reach the desired reduction pressure $P_1$. The conduit 530A is functionally a portion of the fuel production chamber and is to conduct reactive particles 550 motivated by the reactant fluid 240. The length of the conduit 530A is based on the desired production chamber residence time $\tau_2$ for optimal fuel production. For example, longer conduit 531 may be employed to increase the production chamber residence time 12 independently of the reduction chamber residence time $\tau_1$. As the optimal reduction chamber residence time $\tau_1$ may deviate from the optimal production chamber residence time $\tau_2$ by an order of magnitude or more depending on the particle reaction kinetics, residence time is another independent reactor design parameter (along with temperature and pressure) which may be optimized within the reactors 200 and 500 to avoid compromises leading to reduced reactor performance.

Coupled to the conduit 530A is a separator 530B, functioning as a second portion of the fuel production chamber. In the illustrated embodiment, the separator 530B is a commercially available cyclonic separator, though alternative separators known in the art may also be utilized. As illustrated, the separator 530B includes a fluid reaction product outlet, though which reaction product 250 is to be removed, and a particulate drain, through which the reactive particles are fed, by gravity and/or a pressure differential, through a rotary airlock 502 into a hopper 562 monitored through low and high level sensors 575. As shown in FIG. 5, with the elevator 520 on the low pressure side of the airlocks 561 and 502, lengths of the heat exchanger (elevator 520) are between the reduction pressure $P_1$ and oxidation pressure $P_2$, though in alternative embodiments the heat exchanger may be disposed on a high pressure side of a reactor.

Figure 7:
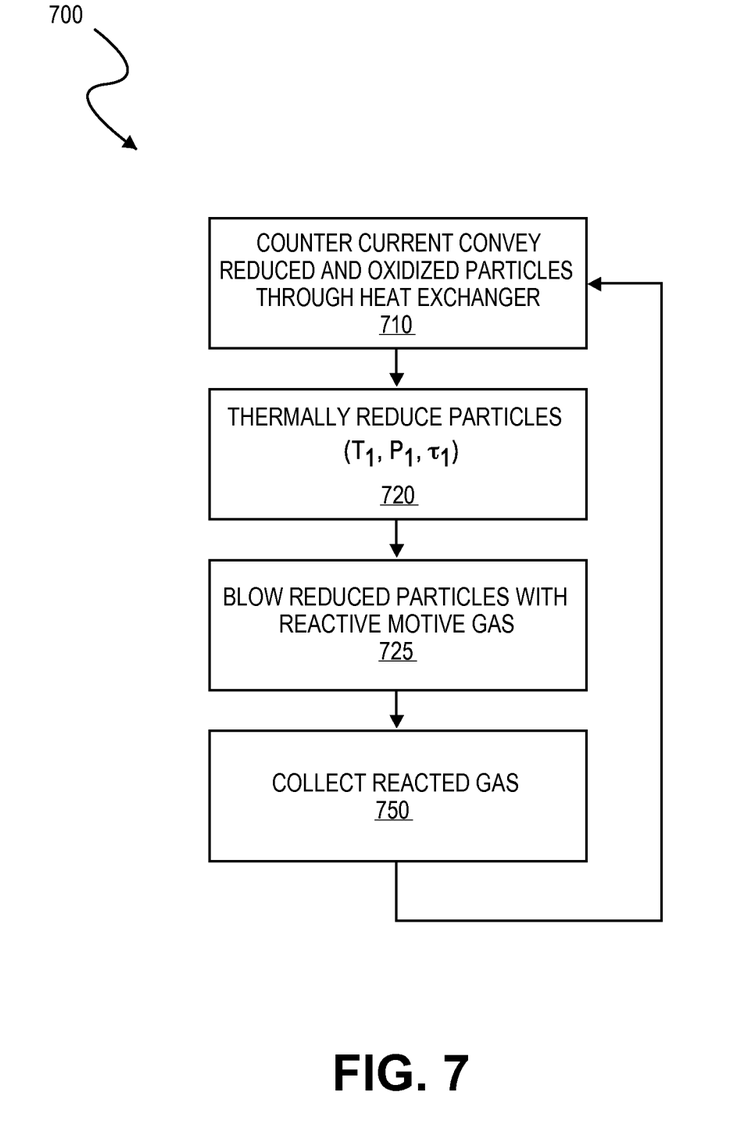
FIG. 7 illustrates a flow diagram of a method that may be performed by the reactor illustrated in FIG. 5, in accordance with an embodiment of the present invention.

With the reactor components illustrated in FIGS. 5 and 6, FIG. 7 illustrates a flow diagram of a method 700 that is continuously performed by the reactor 500 during operation, in accordance with an embodiment of the present invention. Reactive particles 550 are continuously brought from the hopper 562 into direct illumination by the elevator 520 while reduced reactive particles continuously flow down through the elevator 520 to effect heat transfer between the particles at operation 710 (FIG. 7). Solar energy flux 205 is continuously received in the thermal reduction chamber 510 to thermally reduce the reactive particles 550, such as ceria particles, at operation 720 substantially as described elsewhere herein. The reduced reactive particles continuously pass through the rotary airlock 561 and are then blown with a reactive motive gas at operation 725. The reacted motive gas is collected at operation 750 and the reoxidized particles collected in the hopper 562 and gravity fed back into the elevator 520.

As so described, the artisan will appreciate that with many independent design parameters, a design protocol for the reactors described herein may include first determining thermal reduction properties of the reactive particles (e.g., reaction kinetics at a chosen reduction temperature and oxygen partial pressure). A solar concentrator power Q, overall particle mass flow rate through the reduction chamber, and oxygen pumping speed may be independently set to establish the desired reduction temperature, pressure, and residence time ($T_1$, $P_1$, $\tau_1$). With the particle mass flow rate fixed, a desired heat exchanger efficiency may be defined, and the heat exchanger length may be independently set. For the fuel production chamber, the production temperature $T_2$, and production residence time $\tau_2$ may then be set by appropriate component sizing and adjusting the flow of the reactant fluid (two more independent parameters).

It is to be understood that the above description is illustrative, and not restrictive. For example, while flow diagrams in the figures show a particular order of operations performed by certain embodiments of the invention, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. The scope of the invention should, therefore, be determined with reference to the appended claims, along with the full scope of equivalents to which such claims are entitled.

What is claimed is:

1. A solar thermochemical reactor comprising:
a thermal reduction chamber to thermally reduce a first plurality of reactive particles through direct heating by solar energy at a first pressure;
a fuel production chamber coupled to the thermal reduction chamber, the fuel production chamber to reduce a reactant fluid by oxidizing the first plurality of reactive particles at a second pressure;
a conveyance to move the first plurality of reactive particles between the thermal reduction chamber and the fuel production chamber, wherein the conveyance is to maintain a pressure differential between the first and second pressures while continually moving the first plurality of reactive particles; and
a heat exchanger disposed between the thermal reduction chamber and the fuel production chamber, the heat exchanger to transfer heat from the first plurality of reactive particles to a second plurality of reactive particles as the first and second plurality of reactive particles are oppositely conveyed between the thermal reduction chamber and the fuel production chamber, wherein the heat exchanger is a countercurrent exchanger having a hot side inlet coupled to an outlet of the thermal reduction chamber and a hot side outlet coupled to an inlet of the fuel production chamber, and having a cold side inlet coupled to an outlet of the fuel production chamber and a cold side outlet coupled to an inlet of the thermal reduction chamber, and wherein the heat exchanger comprises:
an elevator, the elevator having a hollow shaft with a longitudinal axis, an interior of the hollow shaft to convey the first plurality of reactive particles in a first direction along the longitudinal axis, and an exterior of the hollow shaft to convey the second plurality of reactive particles in a second direction along the longitudinal axis.

2. The solar thermochemical reactor of claim 1, wherein the pressure differential is at least one atmosphere.

3. The solar thermochemical reactor of claim 1, wherein the conveyance comprises a fluid flow restriction through which the first plurality of reactive particles passes between the thermal reduction chamber and the fuel production chamber.

4. The solar thermochemical reactor of claim 3, wherein the fluid flow restriction comprises a first airlock, the first airlock coupled between an outlet of the thermal reduction chamber and an inlet of the fuel production chamber.

5. The solar thermochemical reactor of claim 4, wherein the fluid flow restriction further comprises a second airlock coupled between an outlet of the fuel production chamber and an inlet of the thermal reduction chamber.

6. The solar thermochemical reactor of claim 1, wherein the thermal reduction chamber is to maintain a first temperature, the fuel production chamber is to maintain a second temperature.

7. The solar thermochemical reactor of claim 1, wherein the elevator further comprises a flighting attached to the exterior of the hollow shaft and an outer tube surrounding the flighting, wherein the outer tube is to rotate about the flighting to convey the second plurality of reactive particles, and wherein the interior of the hollow shaft includes fins along a length parallel to the longitudinal axis and extending radially from an interior surface toward the longitudinal axis to facilitate the heat transfer between the first and second plurality of reactive particles.

8. The solar thermochemical reactor of claim 1, wherein the heat exchanger is to be maintained at below the second pressure.

9. The solar thermochemical reactor of claim 1, wherein the heat exchanger has a heat exchanger efficiency of at least 50%.

10. The solar thermochemical reactor of claim 1, wherein the fuel production chamber comprises:
a length of conduit through which the first plurality of reactive particles are blown by a motive fluid comprising the reactant fluid; and
a cyclone separator to separate the motive fluid from the first plurality of reactive particles.

11. A solar thermochemical reactor comprising:
a thermal reduction chamber to thermally reduce a metal oxide particle through direct heating by solar energy at a first pressure;
a fuel production chamber coupled to the thermal reduction chamber, the fuel production chamber to reduce a reactant fluid introduced into the fuel production chamber by oxidizing the metal oxide particle at a second pressure;
a heat exchanging conveyance coupled between the thermal reduction chamber and the fuel production chamber, the heat exchanging conveyance to continuously move the metal oxide particle repeatedly between the thermal reduction chamber and the fuel production chamber, wherein the heat exchanging conveyance is to provide a heat exchanger efficiency of at least 50%; and
a heat exchanger disposed between the thermal reduction chamber and the fuel production chamber, the heat exchanger to transfer heat from the metal oxide particle to a different particle as the metal oxide particle and the different particle are oppositely conveyed between the thermal reduction chamber and the fuel production chamber, the heat exchanger comprises:
an elevator having a hollow shaft with a longitudinal axis, an interior of the hollow shaft to convey the metal oxide particle in a first direction along the longitudinal axis, and an exterior of the hollow shaft to convey the different particle in a second direction along the longitudinal axis.

* * * * *